(No Model.)

G. S. SMITH.
CARPENTER'S PLANE.

No. 556,835. Patented Mar. 24, 1896.

WITNESSES:
Lewis E. Flanders
Lois Moulton

INVENTOR
George S. Smith
BY
Luther V. Moulton
ATTORNEY.

UNITED STATES PATENT OFFICE.

GEORGE S. SMITH, OF GRAND RAPIDS, MICHIGAN.

CARPENTER'S PLANE.

SPECIFICATION forming part of Letters Patent No. 556,835, dated March 24, 1896.

Application filed April 20, 1894. Serial No. 508,365. (No model.)

*To all whom it may concern:*

Be it known that I, GEORGE S. SMITH, a citizen of the United States, residing at Grand Rapids, in the county of Kent and State of Michigan, have invented certain new and useful Improvements in Carpenters' Planes; and I do hereby declare the following to be a full, clear, and exact description of the invention, such as will enable others skilled in the art to which it appertains to make and use the same.

My invention relates to an improved carpenter's plane; and its object is to provide the same with certain new and useful features hereinafter more fully described and particularly pointed out in the claims, reference being had to the accompanying drawings, in which—

Figure 1:
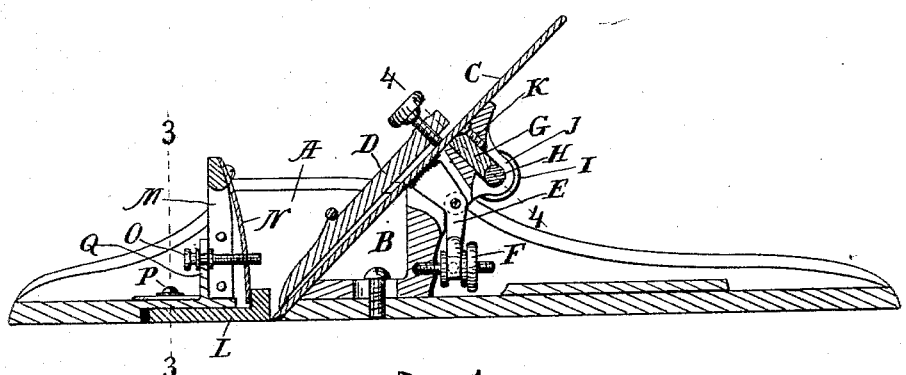
Figure 3:
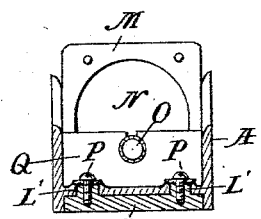
Figure 5:
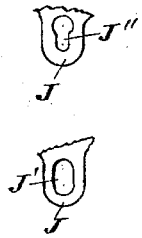
Figure 4:
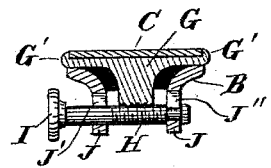
Figure 2:
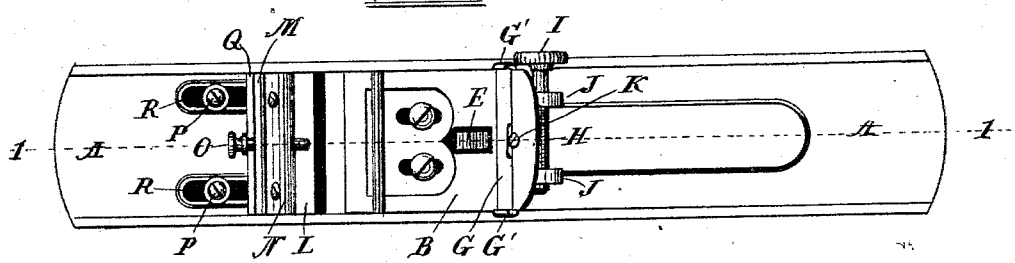

Figure 1 is a longitudinal vertical section, on the line 1 1 of Fig. 2, of a device embodying my invention; Fig. 2, a plan view of the same with the blade and wedge removed; Fig. 3, a vertical section on the line 3 3 of Fig. 1; Fig. 4, an inclined transverse section on the line 4 4 of Fig. 1, and Fig. 5 details showing openings to receive the adjusting-screw H.

Like letters refer to like parts in all of the figures.

A is the main frame of the plane, B the blade-supporting block, C the blade, D the wedge, E the adjusting-lever, and F the adjusting-screw, all being of the usual construction.

In a suitable opening near the upper end of the blade-block B and laterally movable therein is a bar G, having a widened outer end, which is formed with lugs G' to engage the sides of the blade and shift it laterally to square the edge of the same with the under surface of the plane. Said bar G is provided at its lower side with a screw-threaded concave surface engaging the side of a screw H. Said screw is provided with a milled head I and journaled in openings J' J" in lugs J on the back of the block B. Said openings are elongated in the direction of the bar G, and one of the bearings of the screw H is reduced, and the corresponding opening J" is reduced at the lower end to engage this reduced bearing, whereby the screw is prevented from moving longitudinally.

The bar G is held in place in the block B by a screw K, the head of which screw overlaps said bar at one side for this purpose. By removing this screw K and bar G the screw H may be moved into the upper ends of the openings J' J" and thence removed longitudinally, and when in place said screw is held by the engaging screw-threaded side of the bar G.

Within a suitable recess in the bottom of the plane and with its rear angle close to the cutting-edge of the blade C is a throat-slide L, having upwardly-projecting bosses L', extending through elongated openings R. Screws P are inserted in said lugs, whereby the slide L is held in the recess and permitted to move longitudinally therein. A spring N is attached to a suitable yoke-frame M at its upper end and engages the slide L at its lower end to press said slide toward the blade C. A screw O engages said spring and a transverse rib Q and serves to adjust the spring to determine the approach of the slide L to the blade C and thus adjust the opening or throat in front of said blade. Said block L, being movable and pressed toward the blade C by the spring, will yield to the shaving as it passes through the throat. It can therefore be adjusted very close to the blade and thus cause the tool to do very smooth work.

I am aware that a throat-block of somewhat similar construction to mine and capable of being adjusted to and from the blade has heretofore been patented, but said throat-block was not provided with a spring and was incapable of automatically yielding to the shavings, for which reason it did not prevent clogging of the throat.

I am also aware that an adjustable spring has been proposed to take the place of the sliding throat-block, which spring will of course yield to the shaving passing up through the mouth of the plane, but it will yield for a time only during the operation of the plane, as the space between its forward surface and the forward wall of the throat soon receives a sufficient quantity of shavings to force and hold the spring into contact with the cutter, thus not only preventing the spring from yielding, but entirely closing the exit for the shavings. By combining the sliding throat-block with a spring, which causes it automatically to yield to the quantity of shavings passing upward into the throat of the plane, said throat will not become choked and an open exit for the shavings is kept at all times, as will be readily seen.

What I claim is—

1. In a plane, the combination with the blade and its supporting-block, said block having elongated openings one of which has a reduced lower end, of a bar, laterally movable in said block, and engaged with said blade, an adjusting-screw for the bar and blade, said screw being seated in said openings in the block and having a reduced end corresponding with the reduction in the end of one of said openings, and a screw in said block, having its head overlapping one side of said bar and securing the same in place.

2. In a plane, the combination with the blade and its supporting-block, said block having an opening near its upper end and also having lugs formed with elongated openings, one of which latter has a reduced lower end, of a bar laterally movable in said block, said bar having a widened end formed with lugs engaging the sides of the blade, an adjusting-screw for the bar and blade, said screw being seated in the openings in the lugs of the block and having a reduced end corresponding with the reduction in the end of one of said openings, and a screw in said block having its head overlapping one side of said bar and securing the same in place.

3. In a plane, the body, having a recess in its under side adjacent to its throat, and also having an elongated opening, an upwardly-projecting rib and a yoke-frame, in combination with a movable throat-block in said recess, having an end extending upward into the throat of the plane and a boss extending through said elongated opening, a screw engaging said boss, a spring secured at its upper end to said yoke-frame and having its lower end engaged with the upturned end of said throat-block, and an adjusting-screw engaging said rib and spring, substantially as described.

4. In a plane, the body having a recess in its under side adjacent to its throat, in combination with a sliding throat-block within said recess, said block having an upturned part, and a spring engaging said upturned part of the throat-block and causing the latter automatically to adjust itself to the quantity of the shavings passing upward into the throat of the plane, substantially as described.

In testimony whereof I affix my signature in presence of two witnesses.

GEORGE S. SMITH.

Witnesses:
   LUTHER V. MOULTON,
   LOIS MOULTON.